(12) United States Patent
Hyyppa et al.

(10) Patent No.: US 8,447,359 B2
(45) Date of Patent: *May 21, 2013

(54) ELECTRONIC TRANSACTIONS

(75) Inventors: Petri Hyyppa, Oulu (FI); Lauri Piikivi, Oulu (FI); Topi Saukkonen, Oulu (FI); Panu S Markkanen, Oulu (FI); Piotr Cofta, Helsinki (FI)

(73) Assignee: Nokia Corporation, Espoo (FI)

( * ) Notice: Subject to any disclaimer, the term of this patent is extended or adjusted under 35 U.S.C. 154(b) by 4 days.

This patent is subject to a terminal disclaimer.

(21) Appl. No.: 12/982,245

(22) Filed: Dec. 30, 2010

(65) Prior Publication Data

US 2011/0167082 A1 Jul. 7, 2011

Related U.S. Application Data

(63) Continuation of application No. 10/083,169, filed on Feb. 26, 2002, now Pat. No. 7,885,686.

(30) Foreign Application Priority Data

Mar. 2, 2001 (GB) .................................. 0105265.3

(51) Int. Cl.
 *H04B 1/38* (2006.01)
(52) U.S. Cl.
 USPC ........................... 455/558; 455/414.1; 705/40
(58) Field of Classification Search .................. 455/406, 455/414.1–414.3, 410, 411, 416–420, 558; 705/40–42, 78; 709/226, 229, 200
 See application file for complete search history.

(56) References Cited

U.S. PATENT DOCUMENTS

| 5,532,689 A | 7/1996 | Bueno |
| 5,687,385 A | 11/1997 | Janay |
| 5,764,899 A | 6/1998 | Eggleston et al. |
| 5,864,757 A | 1/1999 | Parker |
| 5,867,688 A | 2/1999 | Simmon et al. |
| 5,878,397 A | 3/1999 | Stille et al. |
| 6,112,206 A | 8/2000 | Morris et al. |
| 6,192,380 B1 | 2/2001 | Light et al. |
| 6,195,533 B1 | 2/2001 | Tkatch et al. |
| 6,415,156 B1 | 7/2002 | Stadelmann |

(Continued)

FOREIGN PATENT DOCUMENTS

| DE | 197 16 068 A1 | 10/1998 |
| DE | 197 39 792 A1 | 3/1999 |

(Continued)

OTHER PUBLICATIONS

European search report for corresponding EP application 02251180.2-2221 dated Nov. 3, 2006, pp. 1-6.
Firends Reunited, The One Stop Site to Reunite, Friends Reunited Message Board, Oct. 24, 2001, www.friendsreunited.co.uk, 1 page.
Login for internet banking, www.ebank.hsbc.co.uk/main/loginmain.jsp, Oct. 24, 2001, 1 page.

(Continued)

*Primary Examiner* — Kamran Afshar
*Assistant Examiner* — Khawar Iqbal
(74) *Attorney, Agent, or Firm* — Ditthavong Mori & Steiner, P.C.

(57) ABSTRACT

A method of accomplishing a transaction by a user equipment. Transaction information is inserted in at least one data field of an information entity that associates with the transaction based on information available at the user equipment. The information entity is then transmitted from the user equipment over a wireless interface. The insertion may require authorization. The insertion may occur automatically in response to a predefined event.

20 Claims, 5 Drawing Sheets

U.S. PATENT DOCUMENTS

| | | |
|---|---|---|
| 6,556,680 B1 | 4/2003 | Leonardi |
| 6,760,841 B1 | 7/2004 | Fernandez |
| 6,771,981 B1 | 8/2004 | Zalewski et al. |
| 6,847,816 B1 | 1/2005 | Sarradin |
| 6,853,977 B1 | 2/2005 | Niwa |
| 6,882,863 B2 | 4/2005 | Hansson |
| 6,915,124 B1 | 7/2005 | Kiessling et al. |
| 6,928,623 B1 | 8/2005 | Sibert |
| 6,934,689 B1 | 8/2005 | Ritter et al. |
| 6,944,669 B1 | 9/2005 | Saccocio |
| 6,976,011 B1 | 12/2005 | Capitant et al. |
| 7,027,652 B1* | 4/2006 | I'Anson .................. 382/218 |
| 7,032,003 B1* | 4/2006 | Shi et al. ................. 709/203 |
| 7,043,231 B2 | 5/2006 | Bhatia et al. |
| 2002/0013788 A1* | 1/2002 | Pennell et al. ............ 707/507 |
| 2002/0025796 A1 | 2/2002 | Taylor et al. |
| 2002/0049644 A1 | 4/2002 | Kargman |
| 2002/0065774 A1 | 5/2002 | Young et al. |
| 2002/0065831 A1* | 5/2002 | DePaolo ................ 707/104.1 |
| 2002/0077993 A1 | 6/2002 | Immonen et al. |
| 2002/0086660 A1 | 7/2002 | Sullivan et al. |
| 2002/0112027 A1* | 8/2002 | McHugh et al. .......... 709/218 |
| 2002/0138445 A1 | 9/2002 | Laage et al. |
| 2002/0162009 A1 | 10/2002 | Shmueli et al. |
| 2002/0164995 A1 | 11/2002 | Brown et al. |
| 2002/0187772 A1 | 12/2002 | Hyyppa et al. |
| 2002/0187774 A1 | 12/2002 | Ritter et al. |
| 2003/0069792 A1* | 4/2003 | Blumenthal ................ 705/16 |
| 2003/0212642 A1 | 11/2003 | Weller et al. |
| 2004/0210449 A1 | 10/2004 | Breck et al. |
| 2004/0243520 A1 | 12/2004 | Bishop et al. |
| 2004/0254891 A1 | 12/2004 | Blinn et al. |
| 2005/0026635 A2 | 2/2005 | Michaels et al. |
| 2005/0065950 A1* | 3/2005 | Chaganti et al. .......... 707/100 |
| 2005/0250552 A1 | 11/2005 | Eagle et al. |
| 2006/0039564 A1* | 2/2006 | Rao ......................... 380/270 |
| 2011/0202419 A1* | 8/2011 | Mamdani et al. ......... 705/26.1 |

FOREIGN PATENT DOCUMENTS

| | | |
|---|---|---|
| DE | 197 47 438 A1 | 5/1999 |
| EP | 0 917 327 A1 | 5/1999 |
| EP | 0 996 299 A1 | 4/2000 |
| EP | 1 061 484 A2 | 12/2000 |
| EP | 1 069 539 A2 | 1/2001 |
| GB | 2 351 639 A | 1/2001 |
| WO | WO 98/57474 A1 | 12/1998 |
| WO | WO 00/43962 A1 | 7/2000 |
| WO | WO 01/13314 A2 | 2/2001 |
| WO | WO 02/23367 A1 | 3/2002 |

OTHER PUBLICATIONS

Neue mobile Perspektiven mit WAP, Sellin, Rudiger, vol. 52, No. 11, 1999, pp. 50-53.
NEXT Directory On-Line, Oct. 24, 2001, https://orders02.next.co.uk/Login.asp?Flg=QS&bck=QS, 1 page.
Next Directory, NEXT-On-line Shopping, www.next.co.uk, Oct. 24, 2001, 1 page.
Office action for related U.S. Appl. No. 10/083,169 dated Apr. 21, 2005, pp. 1-12.
Office action for related U.S. Appl. No. 10/083,169 dated Aug. 1, 2008, pp. 1-41.
Office action for related U.S. Appl. No. 10/083,169 dated Aug. 5, 2009, pp. 1-42.
Office action for related U.S. Appl. No. 10/083,169 dated Aug. 9, 2004, pp. 1-12.
Office action for related U.S. Appl. No. 10/083,169 dated Dec. 10, 2009, pp. 1-52.
Office action for related U.S. Appl. No. 10/083,169 dated Feb. 4, 2009, pp. 1-41.
Office action for related U.S. Appl. No. 10/083,169 dated Jun. 9, 2010, pp. 1-57.
Office action for related U.S. Appl. No. 10/083,169 dated Jun. 19, 2007, pp. 1-72.
Office action for related U.S. Appl. No. 10/083,169 dated Mar. 21, 2006, pp. 1-20.
Office action for related U.S. Appl. No. 10/083,169 dated Nov. 15, 2007, pp. 1-35.
Office action for related U.S. Appl. No. 10/083,169 dated Oct. 1, 2010, pp. 1-19.
Office action for related U.S. Appl. No. 10/083,169 dated Sep. 7, 2005, pp. 1-12.
Office action for related U.S. Appl. No. 10/083,169 dated Sep. 19, 2006, pp. 1-29.
The WAPDrive guide to WAP, WAPDrive, 2000, XP-002961230 pp. 1-4.
WAP and Bluetooth technologies—Beyond cable replacement, Camp, Michael T., SIGnal Newsletter No. 3, Nov. 1999, p. 3.
WAP—195—WAEOverview, Version Mar. 29, 2000, Wireless Application Protocol, Wireless Application Environment Overview, Version 1.3, pp. 1-23.
WAP—The wilreless application protocol, Erlandson, et al., Ericsson Review, No. 4, 1998, pp. 150-153.
Welcome to Internet Banking, www.hsbc.co.uk/ebank/main/bwelcmain1.htm, Oct. 24, 2001, 1 page.

* cited by examiner

ELECTRONIC TRANSACTIONS

RELATED APPLICATIONS

This application is a continuation of U.S. application Ser. No. 10/083,169, filed on Feb. 26, 2002 now U.S. Pat. No. 7,885,686, which claims priority to UK Application No. 0105265.3, filed on Mar. 2, 2001, each of which are incorporated herein by reference in their entireties.

FIELD OF THE INVENTION

The present invention relates to electronic transactions, and in particular, but not exclusively, to exchange of transaction information between a user equipment and another party.

BACKGROUND OF THE INVENTION

Various mobile or portable user equipment such as mobile telephones or portable computers are known by the skilled person. A mobile user equipment may be capable of communication via a wireless interface with another device such as a base station of a mobile telecommunication network or any other station. Such a mobile user equipment will be referred to in the following as a mobile station. The mobile station can be adapted for voice, text message or data communication via the wireless link.

The mobile user equipment could also be used for exchange of confidential information such as exchange of personal information required for transactions between two or more parties. The possible transactions could include, without restricting to these, transactions such as ordering of goods and/or services, transactions that associate with payment of purchased goods and/or services, provision of a receipt, or transactions associated with banking services and so on.

The mobile user equipment could also be used for exchange and/or storage of other information such as personal identification data, passport data and so on. It shall thus be appreciated that in this specification the term 'transaction' is not restricted to commercial transactions between parties but instead the term transaction refers to exchange of any information that may be of a confidential or personal nature.

To enable electronic transactions between two entities a common transaction mechanism is required. In general term, a typical transaction mechanism can be defined to comprise features such as the communication media between the parties of the transaction, transaction protocols and parameters, content transfer and presentation formats, security mechanisms and other functions that may also associate with an electronic transaction between the parties.

In a typical transaction the user needs to provide the other party, such as a merchant of goods and/or services with at least some user information, such as a name and address or other contact information of the user. Other confidential information such as credit card number or a personal identity code (e.g., a social security number or national insurance code) may also be required. Typically this information is inserted, i.e., filled in an appropriate form. The form may be a paper document or an electronic document such as a markup language document.

The users may find the insertion of the information inconvenient and at least time consuming. It is also possible that a user may type in incorrect information, e.g. an incorrect credit card number. Furthermore, any means that could improve security of transactions while being easy to use would be welcomed by the users of transaction devices.

Therefore the inventors have found that it could be advantageous if a transaction system could be provided which could free the user from manually inserting confidential, personal or other information in a data form or similar means. It could be even more advantageous if the automatic or semiautomatic data insertion procedure should not prejudice the security of the confidential or personal information of the user.

SUMMARY OF THE INVENTION

Embodiments of the present invention aim to address one or several of the above problems or unsolved issues that associate with exchange of transaction information.

According to one aspect of the present invention, there is provided a method of accomplishing a transaction by user equipment, the method comprising: in response to a predetermined event, automatically inserting transaction information into at least one data field of an information entity associated with the transaction based on information available at the user equipment; and transmitting the information entity from the user equipment over a wireless interface.

According to a further embodiment comprising said insertion of transaction information is authorised by authorisation means. The authorisation may be based on unique identity code or identity module associated with the user equipment. The authorisation may be accomplished at the user equipment and/or by a service provider.

The user information insertion may occur automatically in response to a predefined event.

At least part of the transaction information to be inserted in the information entity may be obtained from a storage means provided at the user equipment. At least part of the transaction information to be inserted in the information entity may be obtained from another information entity.

Said information entity may be transported by means of a standardised data entity.

According to another aspect of the present invention there is provided a user equipment comprising: processing means for insertion transaction information available for the processing means in at least one data field of an information entity that associates with an electronic transaction; and transmitter means for transmitting the information entity from the user equipment to a co-operative device over a wireless interface.

According to another aspect of the present invention there is provided a transaction system comprising: user equipment adapted to exchange transaction information with another party of a transaction; storage means for storing information; processing means for fetching information from the storage means and for insertion of the information in at least one data field of a data entity associated with said transaction; and communication means for transmitting the data entity from the user equipment to a co-operative device over a wireless interface.

The embodiments of the invention may provide an arrangement wherein confidential information can be automatically or semiautomatically exchanged between parties of a transaction.

Thus the user friendliness may be increased. The user may be freed from inserting at least a part of information (e.g. credit card details) he/she would be required to give if the embodiments were not in use at the user equipment. The information inserting procedure may be made faster by means of the embodiments. A more detailed embodiment provides improved security for by means of authorisation procedures.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
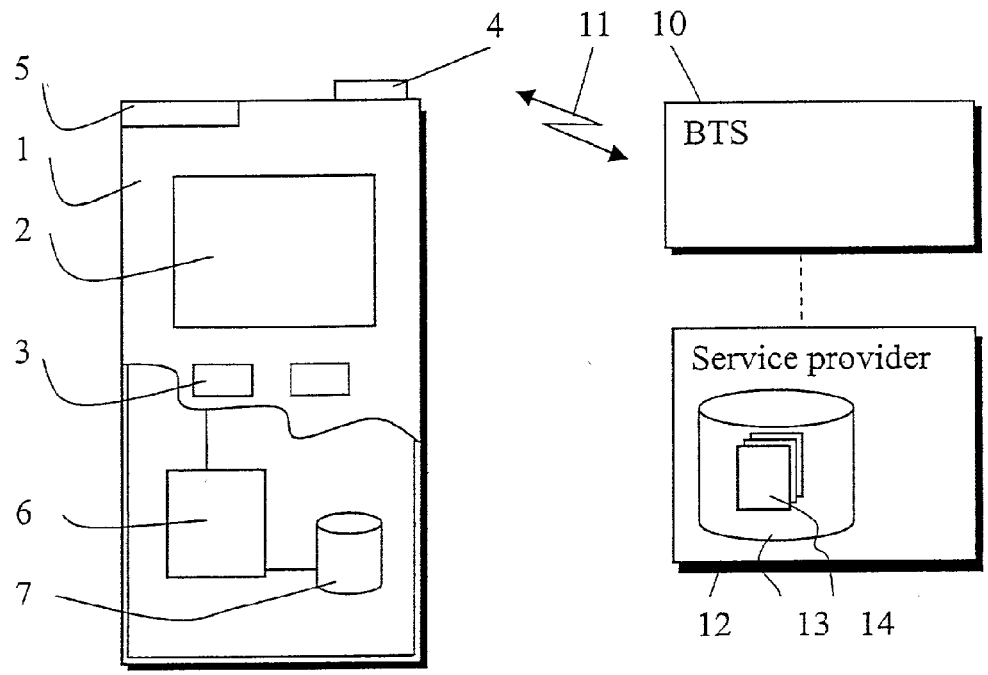
FIG. 1 shows a mobile user equipment that can be used in the embodiments of the present invention.

FIG. 1 shows a mobile user equipment that may be used in the embodiments of the present invention. More particularly, FIG. 1 is a partially sectioned view of a mobile station 1 that may be used for communication over a wireless interface.

If the mobile station 1 subscribes to a cellular mobile communication network the mobile station 1 may be adapted to communicate with a transceiver entity of the mobile communication network. The transceiver entity may comprise a base station (BTS) 10 of the cellular system or any other appropriate element with which the mobile station may communicate with over a wireless interface. Possible transceivers entities are known and are thus not illustrated or described in any greater detail herein.

The mobile station 1 may be provided with user interface means comprising a display 2 and input means. The skilled person is familiar with the user interface of a mobile station and therefore these will not be described in more detail herein. It is sufficient to note that the input means may be formed by control buttons 3 or they may include e.g. voice activation or touch screen means and so on. The mobile station 1 may also be provided with communication interface means such as antenna means for communication with the transceiver entity 10. The antenna means may comprise an external antenna element 4, or then built-in or integrated antenna means may be used. It should be appreciated that antenna means are not an essential requirement in the embodiments of the present invention.

The mobile station 1 is adapted to facilitate use thereof for electronic transactions and for exchange of confidential user information between the mobile station and a remote party. For example, the user of the mobile station 1 may pay for various goods and/or services by means of the mobile station 1 or access various banking services by the mobile station 1. To enable this the mobile station 1 may be provided with a credit card type transaction facility or account means wherein the user may load money. The balance can then be deducted from the account means whenever a payment is made. The mobile station 1 may also be used for transactions that associate with negotiating a purchase of goods and/or services, receiving a receipt of a purchase or with any other operation where information associated with a transaction needs to be exchanged between the user and another party. Examples of other possibilities include use of the mobile station 1 for transactions that associate betting or insurance services. Possible transaction data processing means will be described in more detail with reference to FIG. 2 after the following description of the other elements of the FIG. 1 arrangement.

The mobile station 1 is shown to comprise a processor means 6 and a data storage means 7. The processor means 6 is for processing and/or controlling transactions between the mobile station and other parties. The processor means 6 may be integrated with at least one other processor function of the mobile station 1. The processor means may alternatively be adapted to process data that associates with the transaction processing function only. The data storage means 7 may also be either integrated with the other functions of the mobile station 1 or be assigned solely for the transaction data processing functions. Separation of the transaction functions from other functions of the mobile station 1 may be preferred e.g. for security or usability reasons. The above referenced account means may be implemented by means of the data storage means 7.

FIG. 1 shows an arrangement where said other party comprises a service provider entity 12. As mentioned above, the mobile user equipment 1 may be a mobile station that subscribes to a mobile communication network. In such a case communication between the network and the mobile station 1 occurs over a wireless interface 11, as is indicated by the double headed arrow. The communication network may thus provide a communication media between the mobile station 1 and the service provider entity 12 for the electronic transactions.

Communication over the wireless interface between the mobile station and a base station may be based on any appropriate technique and wireless communication protocol. The possible protocols include, without limiting to these, a Short Message Service message (SMS), WAP (wireless application protocol) messages, email messages or any other messages that are based on the Internet protocol (IP).

The service provider entity 12 may comprise a site 14 that may comprise a page that has been implemented based e.g. on an appropriate markup language. The possible site implementations are known by the person skilled in the art. Examples of the markup languages include WML (Wireless Markup Language), HTML (Hypertext Markup Language), and XHTML (extended hypertext markup language).

The mobile station 1 may load data from the markup language page 14. The user may be enabled to request or download e.g. an order form or questionnaire from the site 14. Alternatively the service provider entity 12 may push data towards the user e.g. by means of a server 13. Data may be transported between the mobile station and the service provider entity 12 based on an appropriate messaging protocol.

The functioning of elements that associate with the operation of transaction means of the mobile user equipment will now be explained by a way of example with reference to FIG. 2. In this example the transaction means provided at the user equipment for processing the transaction functionality are referred to by the term 'electronic wallet'.

Figure 2:
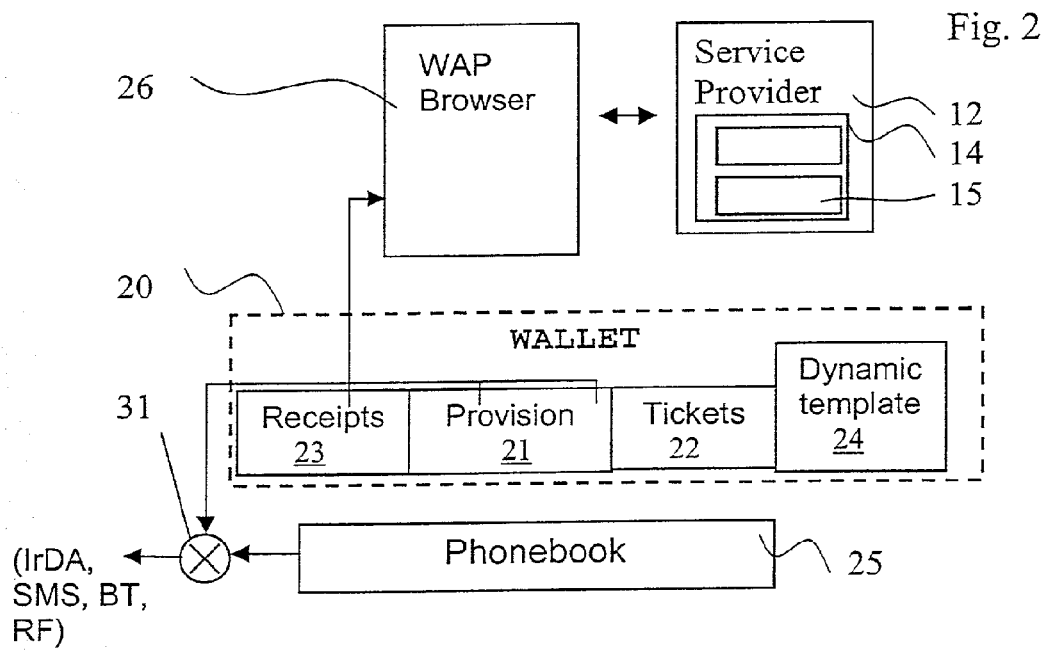
FIG. 2 illustrates system architecture for an embodiment.
Figure 3:
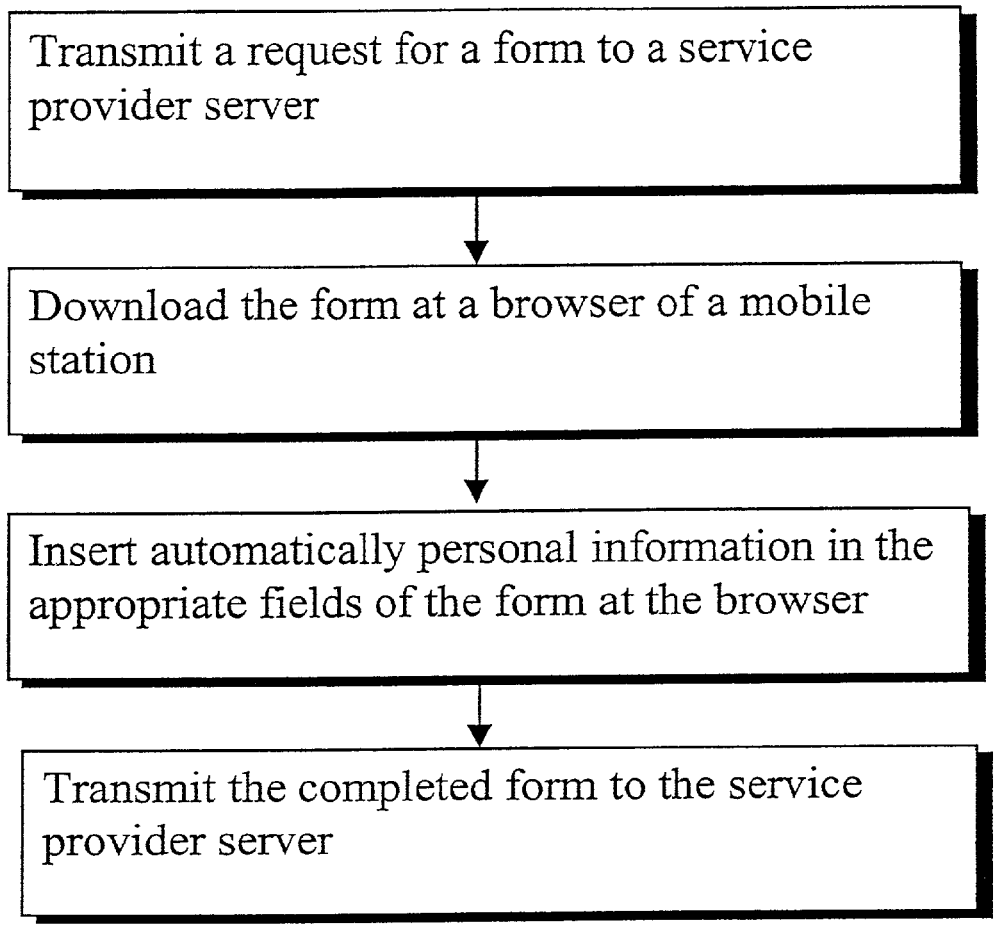
FIG. 3 is a flowchart illustrating an embodiment of the present invention.

FIG. 2 discloses a possible architecture for a system providing means for modifying the operation of an electronic wallet function in accordance with an embodiment of the present the invention. The electronic wallet function is designated by block 20. The electronic wallet block 20 is shown to comprise different subfunction blocks 21 to 24. These function blocks are shown to illustrate that an electronic transaction facility may provide several different usage scenarios and that these may be implemented by means of different functions of the wallet block 20. It shall be appreciated that these functions are not necessary in all applications. Other subfunctions may also be provided in the wallet block 20.

More particularly, FIG. 2 shows blocks such as 'provision' 21, 'tickets' 22, 'receipt' 23 and 'dynamic template' 24.

From these exemplifying function blocks the provision block 21 refers to an ability of the mobile station 1 to update its own configuration based on information stored in the wallet function. The provision block 21 may contain required user information or be enabled to access the user information. The user information may be stored in the memory of the mobile station 1 or on a smart card. Examples of the smart cards include the subscriber identity module (SIM) or secondary smart card. Multiple sets of information may be stored in the storage. For example, credit card data may be stored for two different credit card companies.

The tickets function block 22 refers to entries that result from a transaction. These entries may represent a certain value that may be used for another transaction. For example, an entrance ticket can be acquired to the mobile station via a wireless connection from a ticket issuer. The ticket may then be redeemed later on at an entrance gate thereby enabling use of the mobile station as an authorisation device for the entrance. The function block receipt 23 may be for processing information associated with a proof of transaction. The template function block 24 may be for storing information based on which the way the wallet function interacts with its environment can be modified. The dynamic template block 24 may contain information regarding rules, references, parameters and so on that are required for the operation of the electronic wallet function. That is, the information stored in the dynamic template block 24 can be used in the control of the electronic wallet function.

FIG. 2 shows also three function blocks 28, 29 and 30. These blocks will be referred to commonly in the following by definition electronic wallet management function. At least a part of the functionality of the electronic wallet management function may be controlled by the management service provider 12 of FIG. 1.

Browser block 26 provided in the mobile station is also shown. The browser 26 may be used by the user for communication with the server of the service provider. The user may thus use the browser to pull i.e. download a form from a service provider server or similar source. The user equipment may e.g. fetch an order form from the server, fill it in and transmit the completed order form back to the server to order goods specified in the form. The user may also use the browser for searching possible new service providers, goods and/or services he may be interested in.

FIG. 2 shows also a service provider function block 12. The service provider function is shown to include a further block 14 that designates the form the user may download by means of the browser function 26. The form is shown to include data fields 15 to be filed in by the user equipment 1.

Information that may need to be inserted in a form may include, for example, the name and address of the user, credit card number, passport number, telephone number, personal identity code and so on. This information may be stored in the wallet block 20.

In a preferred embodiment the wallet function is adapted to insert information in correct data fields 15 of the form. Although the automatic insertion of information is accomplished by the wallet function, the user may experience this as it would be done by the browser 26. The filling may alternatively be accomplished by the browser function that is adapted to analyse the received data entity containing a document that requires insertion of information and based on said analysis to fill the required information.

The browser function may also launch a Electronic Commerce Modelling Language (ECML) parser of the wallet function 20 to fill in the required data in the form received from the service provider server. The ECML parser is adapted to identify ECML modelling language fields in a downloaded content page and to fill these fields with appropriate information available for the wallet function. That is, the parser may e.g. detect a field 'address, home' and look if user information tied to this field is available. If the information is available, the parser fills the field with the data and continues to next field.

The communication between the mobile station and the service provider may be based on standardised data entities. An example of such data entities is an electronic data card based on the so called the Electronic Commerce Modelling Language (ECML). The ECML is an open specification that is indented for use in the exchange of purchase related information such as order and payment information in the World Wide Web (WWW). The EMCL defines also a way how specific field information like names, addresses and credit card information can be formatted and transported in the WWW in a standardised manner. Thus the ECML data card format can be used for the transportation of information between the service provider entity and the mobile station. The mobile station may be adapted to automatically recognise that the incoming data comprises a ECML data card form and to automatically fill in the data fields thereof in response to this recognition.

Another example of a possible data entity for the exchange of data between the mobile station and the co-operative device is the so called electronic business card. The electronic business card content type, that is sometimes referred to as digital business card content type, is known by the skilled person. The electronic business cards are designed to be used instead of conventional business cards and may be used for transmitting and interchanging contact information and other information regarding a person or a group of persons to a user terminal. The user terminal may be an Internet enabled computer terminal, a mobile station, hand held organiser, personal information manager, personal data assistant, pager, fax, office equipment, and so on. That is, the user terminal may be any device capable of processing data in electronic form. The destination terminal may also store the information it received on the electronic business card. The data that may be transmitted on conventional electronic business cards may include simple text, and also elements like pictures, company logos, Web addresses, and so on.

An example of the electronic business card applications available for the public is marketed under name 'vCard'. For example, in the WAP the content type vCard is a mandatory feature. The vCard may be implemented on a WAP/WWW page as an object. If data is loaded to a WAP page at the service provider server, the fields of the vCard content type are mapped to WAP page.

A still further example of formats that may be used for the data entity is a format based on an appropriate electronic calendar format. An example of the electronic calendar formats is the vCal.

A data entity can be adapted to carry certain type of information in a certain data field thereof. Therefore it is possible to adapt the mobile station to recognise the specific fields and to insert appropriate information to the fields. Information may be inserted in the fields of the electronic data card e.g. in the following manner:

| Field | Content | Example |
| --- | --- | --- |
| NAME | Name of the user plus any other identity information that needs to be known | "John Smith" |
| Content | A data field including e.g. a credit card number | "Card No"; "expiry date" |
| Address | Delivery address information | "Street n, city xyz" |
| KEY | Signature | F4f9hergn7hgsaw7fa 87gUyg8gytv4IuFyt |

The signature provides additional security for the data transportation and against fraudulent use of e.g. credit card numbers. The digital signature may be based on any appropriate authorisation technique, such as public and/or private keys. The skilled person is aware of these techniques and they will not be explained in more detail herein.

In a specific embodiment the insertion of data in the data fields is authorised based on an identification code. The identification code may be a code that associates with the user equipment. For example, the user equipment verifies internally that the automatic information insertion procedure is allowed (see FIG. 4). According to another possibility user equipment may be identified by the service provider for the authentication purposes based on the identification code (see FIG. 5).

Examples of the possible means based on which the authorisation can be accomplished include, without limiting to these, Subscriber Identity Module (SIM), Number Assignment Module (NAM), and WAP Identity Module (WIM). The authorisation may also be based on identity codes such as a personal identity number (PIN) or a unique product code assigned for each user equipment, such as the IMEI (International Mobile station Equipment Identity), the international mobile subscriber identity (IMSI) code and so on.

Figure 4:
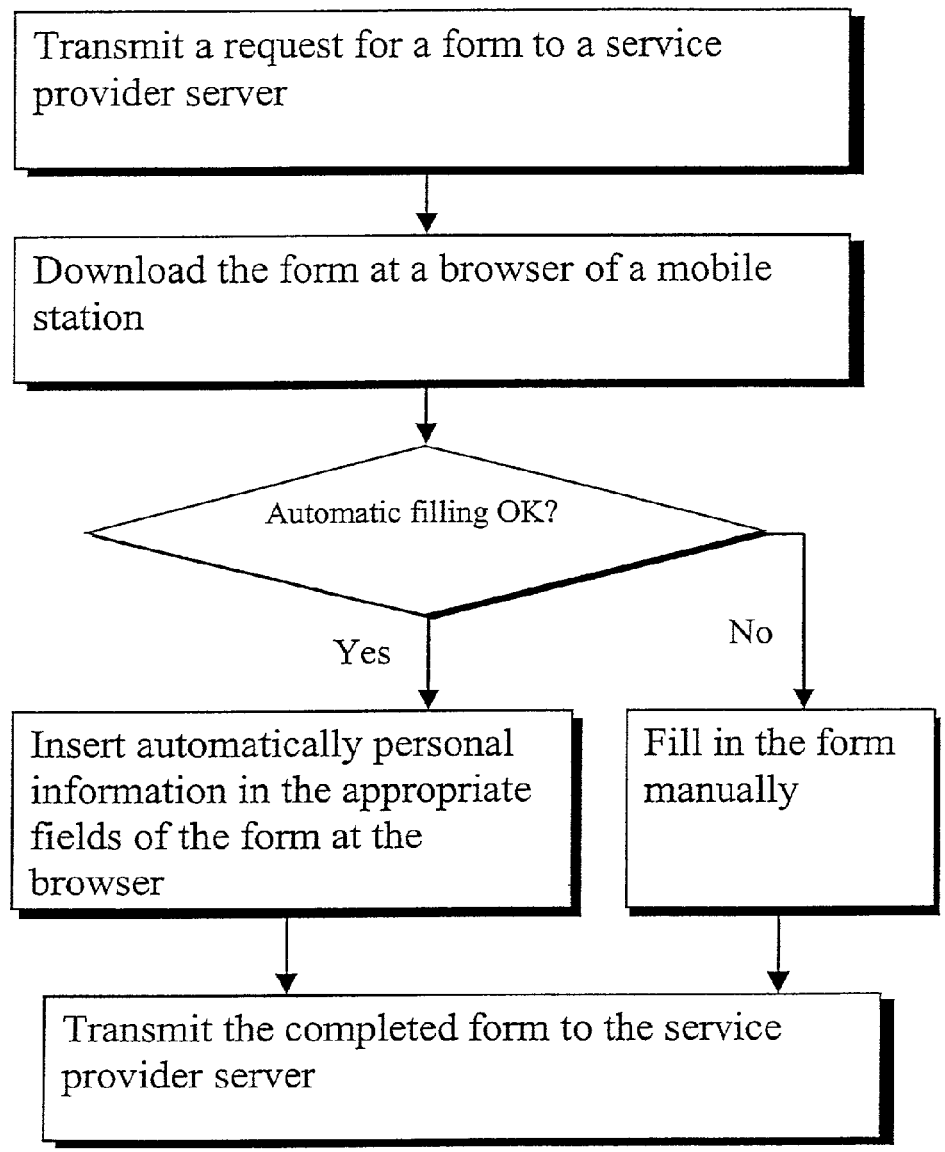
FIGS. 4 and 5 are flowcharts illustrating further embodiments of the present invention.

FIG. 4 illustrates a verification operation that is accomplished at the user equipment. The arrangement may be such that the PIN code of the user equipment or a user specific PIN code is required for the authorisation of the automatic form filling. The user equipment may ask for the PIN code every time the controller of the wallet function recognises that a form is to be filled in. The arrangement may also be such that automatic form filling is in an authorised state if the PIN code was input when the user equipment was switched on or if the PIN code has been input within a predefined time before the automatic filling is required.

Each transaction may also require the PIN to be inserted to make sure that the user has accepted the specific transaction. The acceptance of the automatic form filling may be asked each time from the user who then inputs the PIN into the user equipment. The data fields of the form may then be filled in. A digital signature may also be attached to the form, if it has a field for it. The server may then check the signature to see that the user has accepted the transaction and to verify the user identity. It is thus possible to use both of the methods illustrated by FIGS. 4 and 5 for a single form filling operation.

According to an embodiment the form itself includes a security indicator that is verified at the user equipment. If the form is determined as being sent by a trusted party, the wallet function of the user equipment automatically fills in the form. The security indication may comprise e.g. a key of a key pair, wherein the other key associates with the user equipment.

If the automatic filling is rejected, the user may be provided with a possibility to fill in the form manually.

Figure 5:
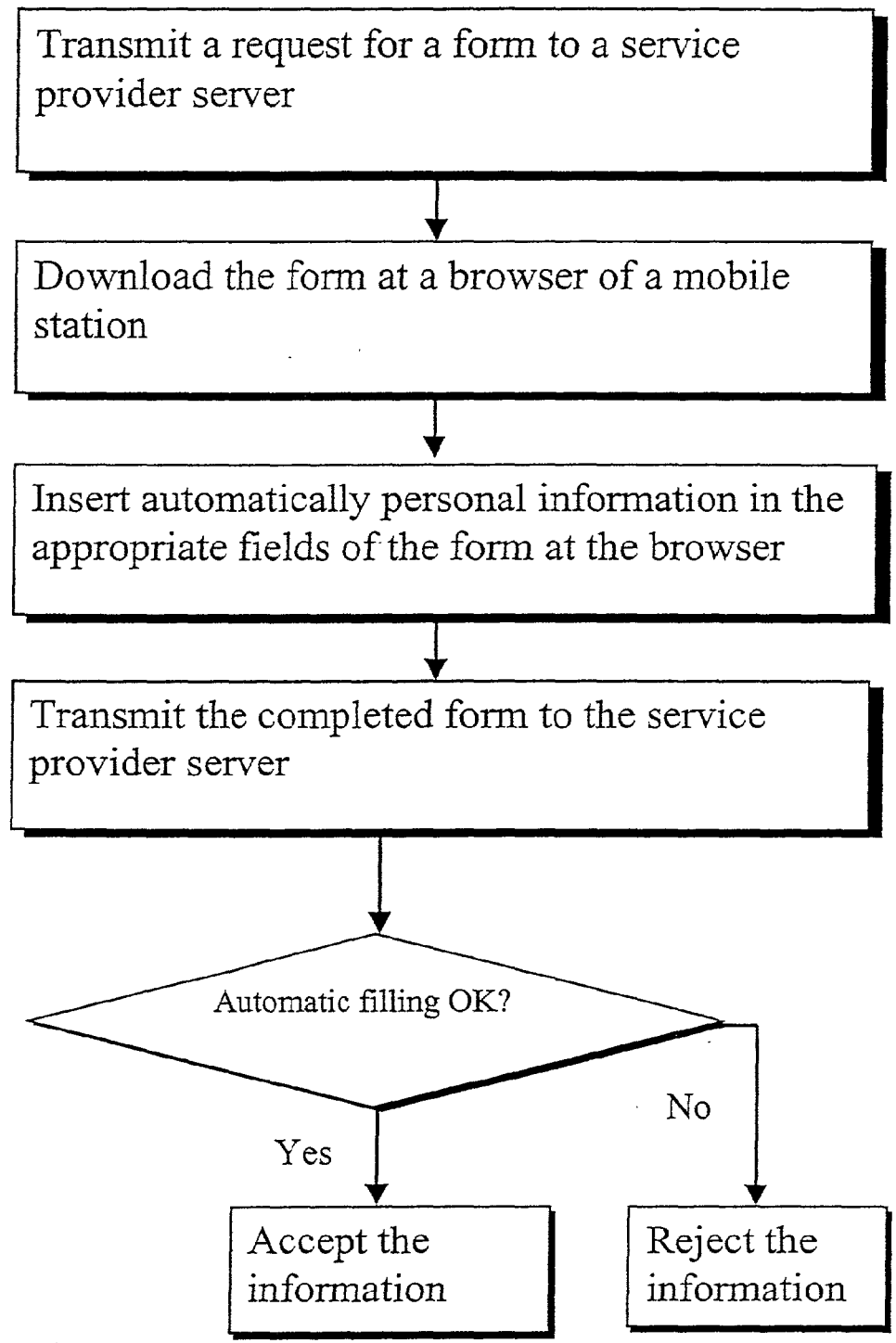

FIG. 5 shows an embodiment where the authorisation is arranged to occur at the service provider. The wallet function may attach an identification code such as an appropriate equipment identifier to the form. The service provider may then compare the identification code with a record of codes. Based on the verification the service provider may then either accept or reject the information supplied on the form. The service provider may have been provided with information associated with the identification code e.g. by the network operator the user equipment subscribes to. The user may also provide the code to the service provider e.g. when signing a service agreement or when using the service for the first time.

Any other appropriate authorisation techniques such as fingerprints or eye retina scan may also be used for this purpose.

According to an embodiment the user has a dedicated filling function somewhere in the communication network. The dedicated filling function may be a server that is adapted to perform the filling operation for the user. When a form is received at the user equipment, the user may simply redirect the form to the server. The server may then ask the user for approval, although this is not necessary in all embodiments. The server fills in the form and sends it to the other party.

Figure 6:
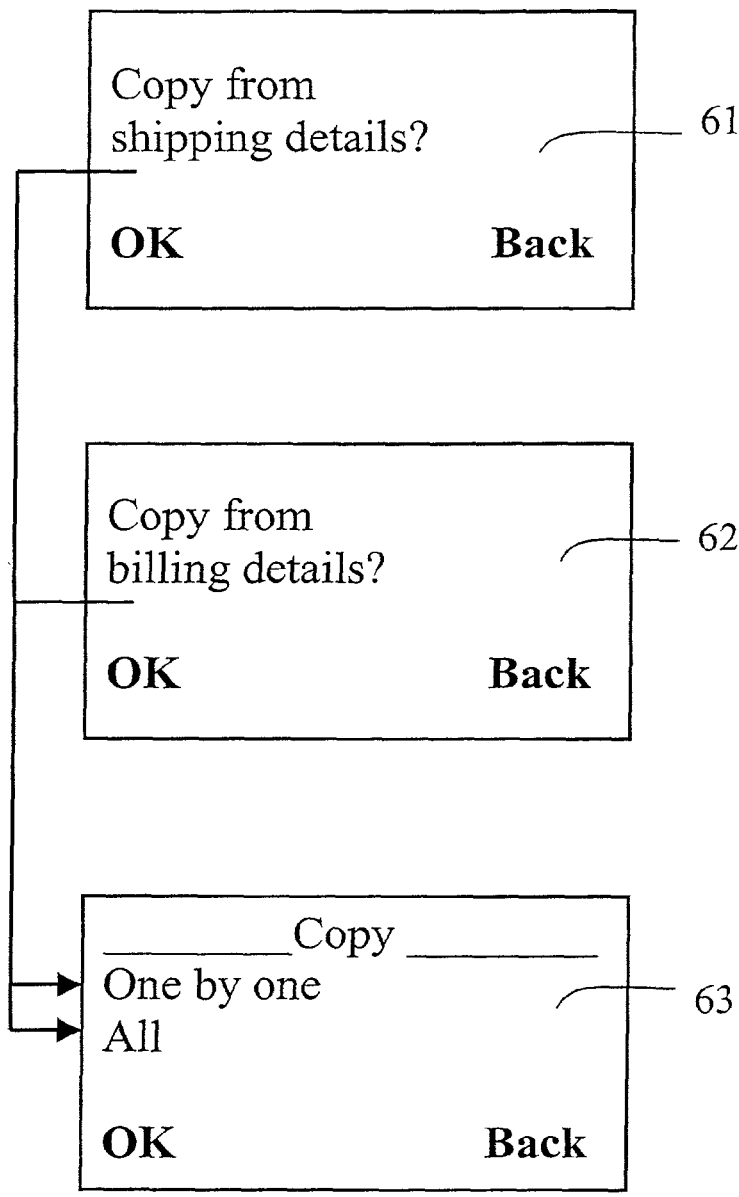
FIG. 6 shows an embodiment of the present invention.

FIG. 6 illustrates an embodiment wherein transaction information can be inserted into a form or similar data entity based on information available in another form. The information may be copied from a first form to a second form at the user equipment. By means of this the user is freed from manual insertion of information that is already available in electronic format. The user may be freed from inserting same information twice. If a form received at the user equipment included information required by another form the user does not need to fill in the information at all. It is enough if he/she copies the information from one form to another form or several other forms.

More particularly, FIG. 6 shows an embodiment wherein shipping information is copied from a shipping particulars form to a billing particulars form (or vice versa or to a third form). The boxes 61, 62, and 63 illustrate displays that are shown to the user by display means of the user equipment. The displays 61 and 62 are for asking a permission to copy the information from the two different forms. Display 63 is for confirming what information is to be copied.

The two forms may include one or more field that associate with the same information (e.g. address, product ID, order No. and so on). For example, the shipping details and billing details form a may contain at least one identical information field. The user may select by display 63 one or more fields that is to be copied e.g. from the form 61 to form 62.

For example, the user may select a field of the form 62 to filled in and if the user equipment detects that the information is already available at the form 61 the user equipment may display a confirmation query 'COPY FROM BILLING DETAILS?'

The user may also select whether all information from a form is copied to another form or only selected information is copied. If the user opt to copy only selected fields the field may be displayed to him/her one by one, and the user needs to confirm the copying for each field. After copying a field from the billing details the user equipment returns to shipping details to enable filling in of a next field. If all fields of the shipping details form are to be filled based on information on the billing details form, said fields are filled in with the copied information before the user equipment returns to the shipping details display.

It is possible to set the user equipment such that all possible old information in the form is replaced. The user equipment may prompt for a confirmation before replacing any old information.

The user equipment may also check if the information is available before continuing the information insertion procedure. If a field is empty at the source document (e.g. at the billing detail form), no query is launched.

In may be advantageous if the copying of information from a first form to any other forms may be accomplished only within a card set, not between different sets. This means that it is possible to adapt the information filling function to operate such that information from a document of a service provider (say credit card company 1) may not be copied into a document by another service provider (say credit card company 2).

Referring now again to FIG. 1, according to a further embodiment the mobile station 1 be provided with a wireless transmitter and/or receiver module 5. The module 5 is not for communication with the base station 10 of the cellular communication system, but is instead for the provision of a local communication link with a co-operative device.

In this embodiment the data forms or similar entities are not transmitted between the user equipment 1 and the service provider via the communication network. Instead, the communication occurs via local wireless links.

The module 5 may be based on use of infrared links, short range radio links, and so on. The infrared link may be based e.g. on the IrDA. The IrDA is a standard defined by Infrared Data Association. The short range radio link may be based e.g. on the Bluetooth™ protocol. The term Bluetooth™ refers to a technology specification by Bluetooth special interest group (SIG) for small factor, low-cost, short range radio links (SRRL) between various devices provided with a Bluetooth™ wireless modules. Another example of the short range interfaces is based on technology used for the so called contactless cards or proximity cards. A short range link for proximity cards is defined e.g. by the International Standardisation Organisation (ISO) specification No. ISO 14443.

According to a further embodiment the user equipment uses different communication means for the transportation of the form or other information entity for the reception and transmission thereof. In other words, the user equipment receives the information entity via a first type of interface and returns the information entity via a second type of interface. For example, the form may be provided to the user equipment by means of a WAP communication. The completed form may then be returned via Bluetooth™ interface.

The information entity may be filled in accordance with predefined set of instructions. For example, the user equipment may be provided with a user profile based on which different events may be responded differently. The instructions may e.g. define what information is to be inserted in the information entity in response to an event and which fields are to be left blank. The instructions may also define the source of information to be used for a certain type of information entities, the level of "privacy" to be used for different information entities and so on.

It should be appreciated that whilst embodiments of the present invention have been described in relation to mobile user equipment, embodiments of the present invention are applicable to any other suitable type of user equipment capable of communication over a wireless interface.

It is also noted herein that while the above describes exemplifying embodiments of the invention, there are several variations and modifications which may be made to the disclosed solution without departing from the scope of the present invention as defined in the appended claims.

What is claimed is:

1. A method, comprising:
retrieving at a user device transaction information based, at least in part, upon descriptive information of content data in one or more data records stored in the device, wherein the transaction information includes context information obtained independently of user input to the device;
selecting, at the device, one or more of the data records based on the transaction information;
verifying internally at the device based, at least in part, on an identification code associated with the device, that automatic copying of one or more portions of the selected one or more data records into associated fields of an external data entity is allowed; and
in response to the verification, automatically copying the one or more portions of the selected one or more data records into the associated fields of the external data entity.

2. A method of claim 1, wherein the context information is associated with the device.

3. A method of claim 1, wherein the selection of the one or more data records occurs independently of the transmission of the selected one or more data records to the external entity.

4. A method of claim 1, wherein the selected one or more data records are relevant for redemption via the external entity.

5. A method of claim 4, further comprising:
causing, at least in part, presentation of one or more of the selected data records to the external entity; and
receiving an indication from the external entity that the presented one or more data records can be redeemed.

6. A method of claim 4, comprising:
causing, at least in part, transmission of the one or more other data entities to the external entity, another external entity, or a combination thereof.

7. A method of claim 6, wherein the external entity, another external entity, or a combination thereof, comprises one or more webpages, one or more websites, one or more servers, one or more service providers, or a combination thereof, and the redemption is associated with one or more admission tickets.

8. A method of claim 1, wherein the content data of the data records is stored in a protected memory of the device, and access to the content data of the data records is subject to access control.

9. A method of claim 8, wherein the protected memory includes a subscriber identity module (SIM).

10. A method of claim 1, wherein the context information specifies a transaction party, time, location, credit card data, or a combination thereof.

11. An apparatus comprising:
at least one processor; and
at least one memory including computer program code for one or more programs,
the at least one memory and the computer program code configured to, with the at least one processor, cause the apparatus to perform at least the following,
retrieve at a user device transaction information based, at least in part, upon descriptive information of content data in one or more data records stored in the device, wherein the transaction information includes context information obtained independently of user input to the device,
select, at the device, one or more of the data records based on the transaction information,
verify internally at the device based, at least in part, on an identification code associated with the device, that automatic copying of one or more portions of the selected one or more data records into associated fields of an external data entity is allowed; and
in response to the verification, automatically copy the one or more portions of the selected one or more data records into the associated fields of the external data entity.

12. An apparatus of claim 11, wherein the context information is associated with the device.

13. An apparatus of claim 11, wherein the selection of the one or more data records occurs independently of the transmission of the selected one or more data records to the external entity.

14. An apparatus of claim 11, wherein the selected one or more data records are relevant for redemption via the external entity.

15. An apparatus of claim 14, wherein the apparatus is further caused to:
cause, at least in part, presentation of one or more of the selected data records to the external entity, and
receive an indication from the external entity that the presented one or more data records can be redeemed.

16. An apparatus of claim 11, wherein the content data of the data records is stored in a protected memory of the device, and access to the content data of the data records is subject to access control.

17. An apparatus of claim 16, wherein the protected memory includes a subscriber identity module (SIM).

18. A non-transitory computer-readable storage medium carrying one or more sequences of one or more instructions which, when executed by one or more processors, cause an apparatus to at least perform the following steps:
retrieving at a user device transaction information based, at least in part, upon descriptive information of content data in one or more data records stored in the device, wherein the transaction information includes context information obtained independently of user input to the device;
selecting, at the device, one or more of the data records based on the transaction information;
verifying internally at the device based, at least in part, on an identification code associated with the device, that automatic copying of one or more portions of the selected one or more data records into associated fields of an external data entity is allowed; and
in response to the verification, automatically copying the one or more portions of the selected one or more data records into the associated fields of the external data entity.

19. A non-transitory computer-readable storage medium of claim 18, wherein the selected one or more data records are relevant for redemption via the external entity.

20. A non-transitory computer-readable storage medium of claim 19, wherein the apparatus is caused to further perform:
causing, at least in part, presentation of one or more of the selected data records to the external entity; and
receiving an indication from the external entity that the presented one or more data records can be redeemed.

* * * * *